United States Patent
Karino

(10) Patent No.: US 9,083,657 B2
(45) Date of Patent: Jul. 14, 2015

(54) FLOW COMMUNICATION SYSTEM

(75) Inventor: Shuichi Karino, Tokyo (JP)

(73) Assignee: NEC Corporation, Tokyo (JP)

( * ) Notice: Subject to any disclaimer, the term of this patent is extended or adjusted under 35 U.S.C. 154(b) by 113 days.

(21) Appl. No.: 13/982,480

(22) PCT Filed: Aug. 16, 2011

(86) PCT No.: PCT/JP2011/004601
§ 371 (c)(1),
(2), (4) Date: Jul. 29, 2013

(87) PCT Pub. No.: WO2012/111051
PCT Pub. Date: Aug. 23, 2012

(65) Prior Publication Data
US 2013/0308645 A1 Nov. 21, 2013

(30) Foreign Application Priority Data
Feb. 17, 2011 (JP) ................................ 2011-031737

(51) Int. Cl.
*H04L 12/741* (2013.01)
*H04L 12/801* (2013.01)

(52) U.S. Cl.
CPC .............. *H04L 45/745* (2013.01); *H04L 45/54* (2013.01); *H04L 47/10* (2013.01)

(58) Field of Classification Search
None
See application file for complete search history.

(56) References Cited

U.S. PATENT DOCUMENTS

| | | | | |
|---|---|---|---|---|
| 6,870,850 | B1 * | 3/2005 | Fichou et al. | 370/400 |
| 7,305,492 | B2 * | 12/2007 | Bryers et al. | 709/249 |
| 7,606,154 | B1 * | 10/2009 | Lee | 370/232 |
| 7,817,549 | B1 * | 10/2010 | Kasralikar et al. | 370/232 |
| 7,817,640 | B2 * | 10/2010 | Yuan et al. | 370/395.2 |
| 2005/0013300 | A1 * | 1/2005 | Akahane et al. | 370/395.3 |
| 2008/0259867 | A1 * | 10/2008 | Guo | 370/330 |

FOREIGN PATENT DOCUMENTS

| | | |
|---|---|---|
| CN | 1578272 A | 2/2005 |
| CN | 101572670 A | 11/2009 |
| CN | 101938396 A | 1/2011 |

(Continued)

OTHER PUBLICATIONS

International Search Report (ISR) (PCT Form PCT/ISA/210), in PCT/JP2011/004601, dated Nov. 4, 2011.

(Continued)

*Primary Examiner* — Hassan Kizou
*Assistant Examiner* — Hashim Bhatti
(74) *Attorney, Agent, or Firm* — McGinn IP Law Group, PLLC

(57) ABSTRACT

A flow communication system has: a node having a flow table; and a controller configured to set a flow entry in the flow table. Each flow entry that is set in the flow table specifies packet processing which is performed with respect to a packet matching a match condition. If a hit entry exists in the flow table, the node performs the packet processing specified by the hit entry with respect to a received packet. If a deletion condition with regard to a first flow entry in the flow table is satisfied, the node deletes the first flow entry from the flow table. The deletion condition includes that a sum of packet lengths of all the received packets matching the first flow entry after the first flow entry is set up exceeds a predetermined deletion unit length.

9 Claims, 13 Drawing Sheets

(56) References Cited

FOREIGN PATENT DOCUMENTS

| CN | 102035748 A | 4/2011 |
|---|---|---|
| WO | WO 2006/085374 A1 | 8/2006 |

OTHER PUBLICATIONS

Nick McKeown et al., "OpenFlow: Enabling Innovation in Campus Networks", ACM SIGCOMM Computer Communication Review, vol. 38, No. 2, 2008. (http://www.openflowswitch.org//documents/openflow-wp-latest.pdf).
English translation of PCT/ISA/237 (written opinion of the international searching authority, dated Oct. 4, 2011).
PCT/IB/373 dated Aug. 21, 2013.
Open Flow Switch Specification Version 1.0.0 (Wire Protocol 0x01), Dec. 31, 2009, pp. 1-42, XP008166937.
European Search Report dated Aug. 27, 2014.
Chinese Office Action dated Mar. 24, 2015 with a partial English translation thereof.

* cited by examiner

Fig. 5

<FLOW TABLE TBL>

| | Key | Action | Stat | Timeout | Byte_expire |
|---|---|---|---|---|---|
| ENT1 | | | | | |
| ENT2 | | | | | |
| ENT3 | | | | | |

FLOW COMMUNICATION SYSTEM

TECHNICAL FIELD

The present invention relates to a flow communication system using a flow table.

BACKGROUND ART

A technique "OpenFlow" is described in Non-Patent Literature 1 (Nick McKeown et al., "OpenFlow: Enabling Innovation in Campus Networks", ACM SIGCOMM Computer Communication Review, Vol. 38, No. 2, 2008). According to the OpenFlow, route control, fault recovery, load balancing and optimization are performed with respect to each flow. An open flow switch (OFS) serving as a forwarding node and an open flow controller (OFC) controlling the open flow switch are used in the OpenFlow.

Typical packet processing in the OpenFlow will be described with reference to FIG. 1. The open flow switch has a flow table and performs packet processing in accordance with the flow table. Each flow entry in the flow table has fields such as a match condition (Key), an action (Action), statistical information (Stat) and a time-out value (Timeout). The match condition, which is expressed by a combination of fields of a packet header, is used for determining whether or not a received packet matches the flow entry. The action indicates a content of packet processing that is performed with respect to a packet matching the match condition (e.g. the packet processing is to output the received packet to a specified port).

When receiving a packet belonging to a flow, the open flow switch refers to the flow table to search for a flow entry whose match condition matches the received packet. A flow entry that matches the received packet is hereinafter referred to as a "hit entry". If the hit entry is not yet set in the flow table (i.e. in a case of miss), the open flow switch transmits the received packet as an entry setup request (first packet) to the open flow controller.

The open flow controller receives the entry setup request (first packet) from the open flow switch. In response to the reception of the first packet, the open flow controller generates a new flow entry for treating the first packet and sets the new flow entry in the flow table of the open flow switch. More specifically, the open flow controller instructs the open flow switch to add the new flow entry to the flow table, and the open flow switch adds the new flow entry to the flow table in accordance with the instruction.

Subsequently, the open flow controller sends the first packet back to the open flow switch. The open flow switch receives the first packet as a received packet again. At this time, the hit entry matching the first packet exists in the flow table (i.e. in a case of hit). In this case, the open flow switch performs the processing specified by the action of the hit entry with respect to the received packet. After that, packets belonging to the same flow as the first packet are treated in accordance with the same hit entry, without through the open flow controller.

If a certain time has passed since a flow entry has been newly set up or if a certain time has passed since the last time a flow entry has become a hit entry, the flow entry is deleted from the flow table. What specifies the above-mentioned certain time is the time-out value (Timeout) in each flow entry. That is, the open flow switch monitors time-out in each flow entry and, if time-out occurs in a flow entry, deletes (removes) the flow entry from the flow table.

CITATION LIST

Non Patent Literature

[NPL 1] Nick McKeown et al., "OpenFlow: Enabling Innovation in Campus Networks", ACM SIGCOMM Computer Communication Review, Vol. 38, No. 2, 2008. (http://www.openflowswitch.org//documents/openflow-wp-latest.pdf)

SUMMARY OF INVENTION

The inventor of the present application has recognized the following points. In the case of the typical OpenFlow as shown in FIG. 1, the same packet processing is performed with respect to a sequence of packets belonging to the same single flow. In other words, it is not possible to perform different packet processing (e.g. outputting to different output ports) depending on conditions with respect to a sequence of packets belonging to the same single flow. For example, when a plurality of messages are transmitted by a single flow, it is not possible to perform different switching with respect to each message.

An object of the present invention is to provide a technique that can perform plural kinds of packet processing with respect to a sequence of packets belonging to a single flow.

In an aspect of the present invention, a flow communication system is provided. The flow communication system has: a node having a flow table; and a controller configured to set a flow entry in the flow table. Each flow entry that is set in the flow table specifies packet processing which is performed with respect to a packet matching a match condition. A flow entry that a packet received by the node matches is a hit entry. If the hit entry exists in the flow table, the node performs the packet processing specified by the hit entry with respect to the received packet. If a deletion condition with regard to a first flow entry in the flow table is satisfied, the node deletes the first flow entry from the flow table. The deletion condition includes that a sum of packet lengths of all the received packets matching the first flow entry after the first flow entry is set up exceeds a predetermined deletion unit length.

In another aspect of the present invention, a node is provided. The node has: a table management unit configured to manage a flow table; and a packet processing unit configured to perform packet processing with respect to a received packet. Each flow entry that is set in the flow table specifies the packet processing which is performed with respect to a packet matching a match condition. A flow entry that the received packet matches is a hit entry. If the hit entry exists in the flow table, the packet processing unit performs the packet processing specified by the hit entry with respect to the received packet. If a deletion condition with regard to a first flow entry in the flow table is satisfied, the table management unit deletes the first flow entry from the flow table. The deletion condition includes that a sum of packet lengths of all the received packets matching the first flow entry after the first flow entry is set up exceeds a predetermined deletion unit length.

According to the present invention, it is possible to perform plural kinds of packet processing with respect to a sequence of packets belonging to a single flow.

BRIEF DESCRIPTION OF DRAWINGS

FIG. 5 is a conceptual diagram showing a flow table according to the exemplary embodiment of the present invention.

DESCRIPTION OF EMBODIMENTS

Exemplary embodiments of the present invention will be described with reference to the attached drawings.

1. Summary

Figure 1:
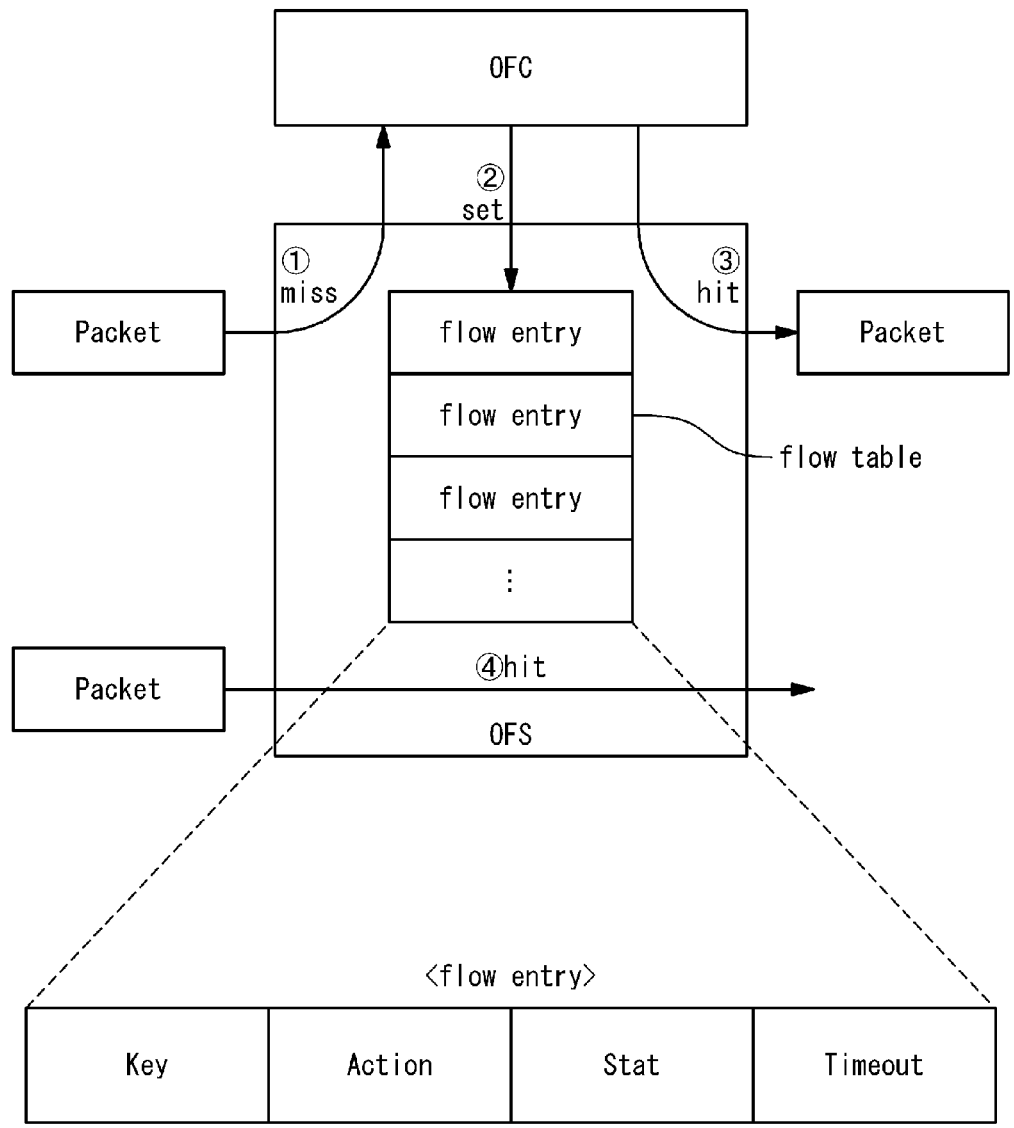
FIG. 1 is a conceptual diagram for explaining typical OpenFlow.
Figure 2:
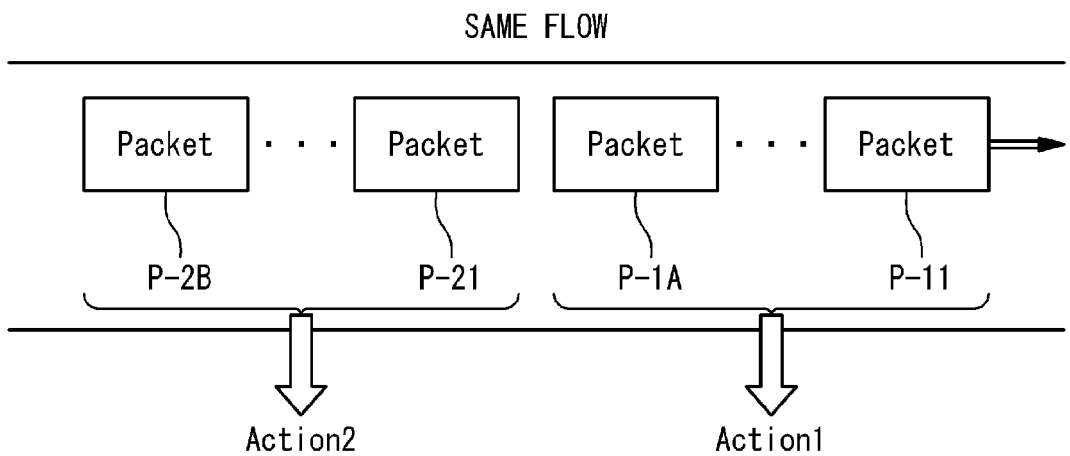
FIG. 2 is a conceptual diagram showing flow communication according to an exemplary embodiment of the present invention.

FIG. 2 conceptually shows flow communication according to an exemplary embodiment of the present invention. In FIG. 2, a first packet group comprised of A pieces of packets P-11 to P-1A and a second packet group comprised of B pieces of packets P-21 to P-2B belong to the same flow.

According to the present exemplary embodiment, it is possible to apply different packet processing (Action1 and Action2) respectively to the first packet group and the second packet group. For that purpose, after the first packet group has been treated in accordance with a flow entry, the flow entry is deleted from the flow table. After that, a different flow entry for treating the second packet group is newly set. It is thus possible to apply different packet processing respectively to the first packet group and the second packet group.

That is, according to the present exemplary embodiment, a new deletion condition that depends on a packet processing amount is introduced as a condition for deleting a flow entry from the flow table, separately from the conventional time-out (Timeout). The new deletion condition is that "an amount of packets that have been treated by a flow entry exceeds a predetermined amount". More specifically, the new deletion condition is that "a sum of packet lengths of all the received packets matching a flow entry after the flow entry is set up exceeds a predetermined deletion unit length". As a result, the packet processing with respect to a sequence of packets belonging to the same flow can be changed for each deletion unit length.

Figure 3:
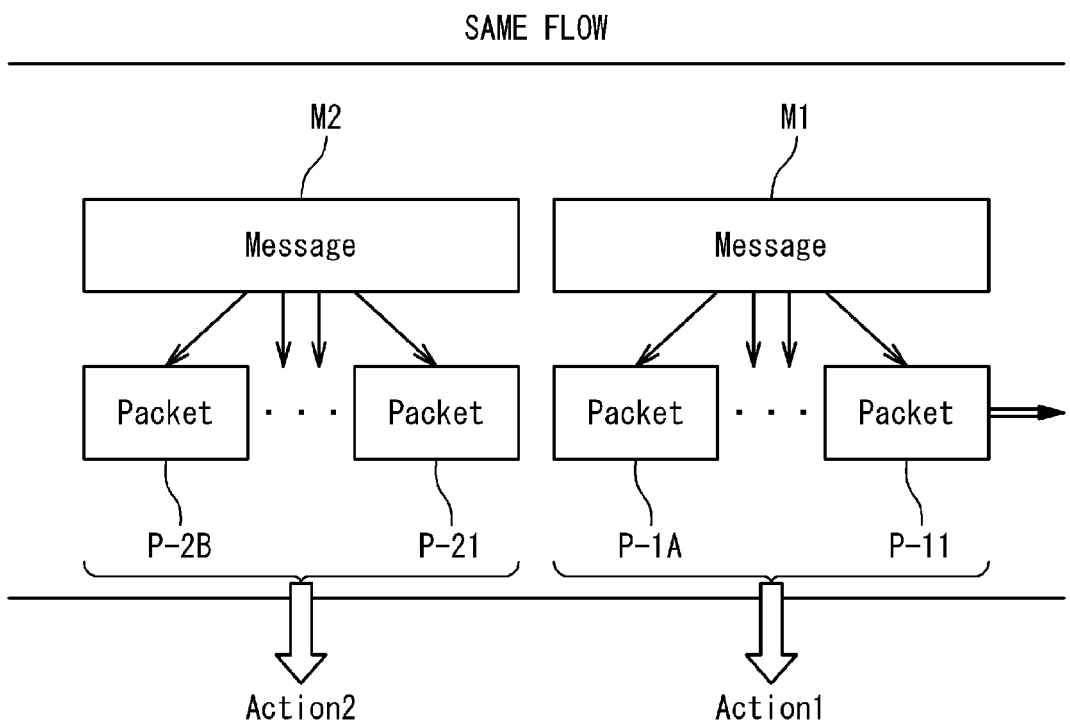
FIG. 3 is a conceptual diagram showing flow communication according to the exemplary embodiment of the present invention.

As an example, let us consider a case where a plurality of messages (M1 and M2) are communicated by a single flow as shown in FIG. 3. Here, the message is a unit of data that is transmitted and received by an upper layer than the packet (typically, an application layer). Examples of the message include an HTTP request and an HTTP response. According to the present exemplary embodiment, in the case where the plurality of messages are transmitted by the same single flow, the packet processing can be changed for each message. For example, as shown in FIG. 3, packet processing Action1 is applied to the message M1 that is divided into the packets P-11 to P-1A and transmitted. The deletion unit length with regard to the flow entry specifying the packet processing Action1 is set to a value depending on a message length of the message M1. As a result, the flow entry is deleted after the packet processing with respect to the message M1 is completed. After that, a new flow entry is set in the flow table in order to treat the second message M2. The deletion unit length with regard to the new flow entry is set to a value depending on a message length of the message M2.

According to the present exemplary embodiment, as described above, it is possible to perform plural kinds of packet processing with respect to a sequence of packets belonging to a single flow.

2. Configuration

Figure 4:
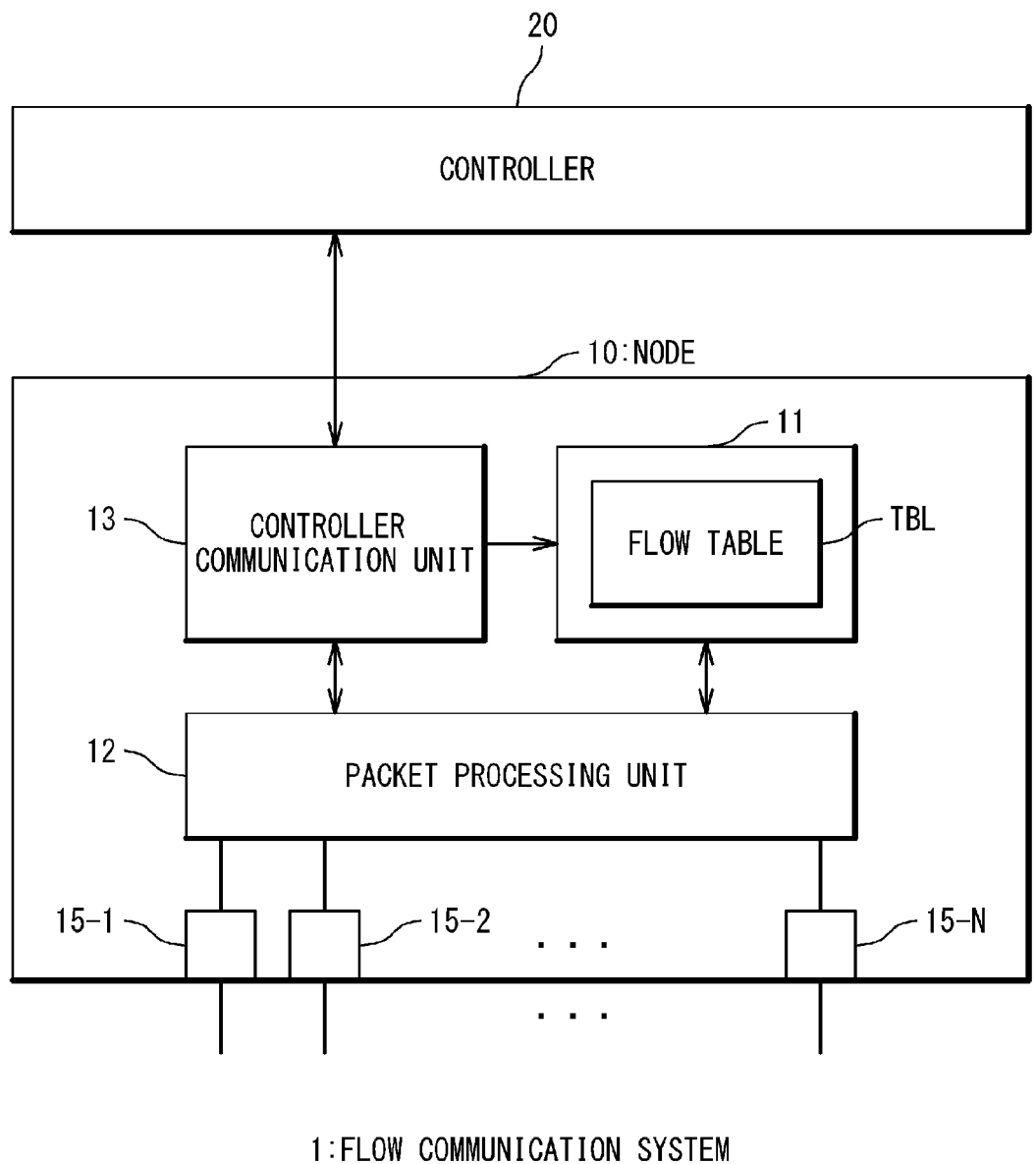
FIG. 4 is a block diagram showing a configuration of a flow communication system according to the exemplary embodiment of the present invention.

FIG. 4 is a block diagram showing a configuration of a flow communication system 1 according to the present exemplary embodiment. The flow communication system 1 has a node 10 and a controller 20. The node 10 and the controller 20 are communicatably connected with each other. For example, in a case of the OpenFlow, the node 10 is an open flow switch (OFS) and the controller 20 is an open flow controller (OFC).

The node 10 has a flow table TBL and performs packet processing in accordance with the flow table TBL. More specifically, the node 10 has a table management unit 11, a packet processing unit 12, a controller communication unit 13 and N ports 15-1 to 15-N. The table management unit 11 manages the flow table TBL. The table management unit 11 has a memory device, and the flow table TBL is stored in the memory device. The packet processing unit 12 receives a packet through a port 15 (input port). The packet processing unit 12 refers to the flow table TBL to perform packet processing with respect to the received packet. Furthermore, the packet processing unit 12 transmits the packet through a port 15 (output port). The controller communication unit 13 has a function of communicating with the controller 20. In the case of the OpenFlow, SecureChannel corresponds to the controller communication unit 13.

The controller 20 sets a flow entry in the flow table TBL.

FIG. 5 is a conceptual diagram showing the flow table TEL according to the present exemplary embodiment. The flow table TBL has 0 or more flow entry (ENT1, ENT2, ENT3 . . . ). Each flow entry ENT has fields such as a match condition (Key), an action (Action), statistical information (Stat) and a time-out value (Timeout). The match condition, which is expressed by a combination of fields of a packet header, is used for determining whether or not a received packet matches the flow entry ENT. The action indicates a content of packet processing that is performed with respect to a packet matching the match condition (e.g. the packet processing is to output the received packet to a specified port).

According to the present exemplary embodiment, each flow entry ENT further has a parameter "Byte_expire". The Byte_expire is a packet processing amount that is allowed before the flow entry ENT is deleted. That is, the Byte_expire corresponds to a "remaining processing amount" before the entry deletion. When a flow entry ENT is newly set up, the Byte_expire thereof is initialized to the above-mentioned predetermined deletion unit length. Then, each time the flow entry ENT becomes the hit entry, the Byte_expire is decreased by a packet length of the received packet. The Byte_expire being less than a packet length of the received packet means that the above-mentioned "deletion condition" is satisfied. Therefore, in this case, the flow entry ENT is deleted from the flow table TBL.

3. Processing Flow

Figure 6:
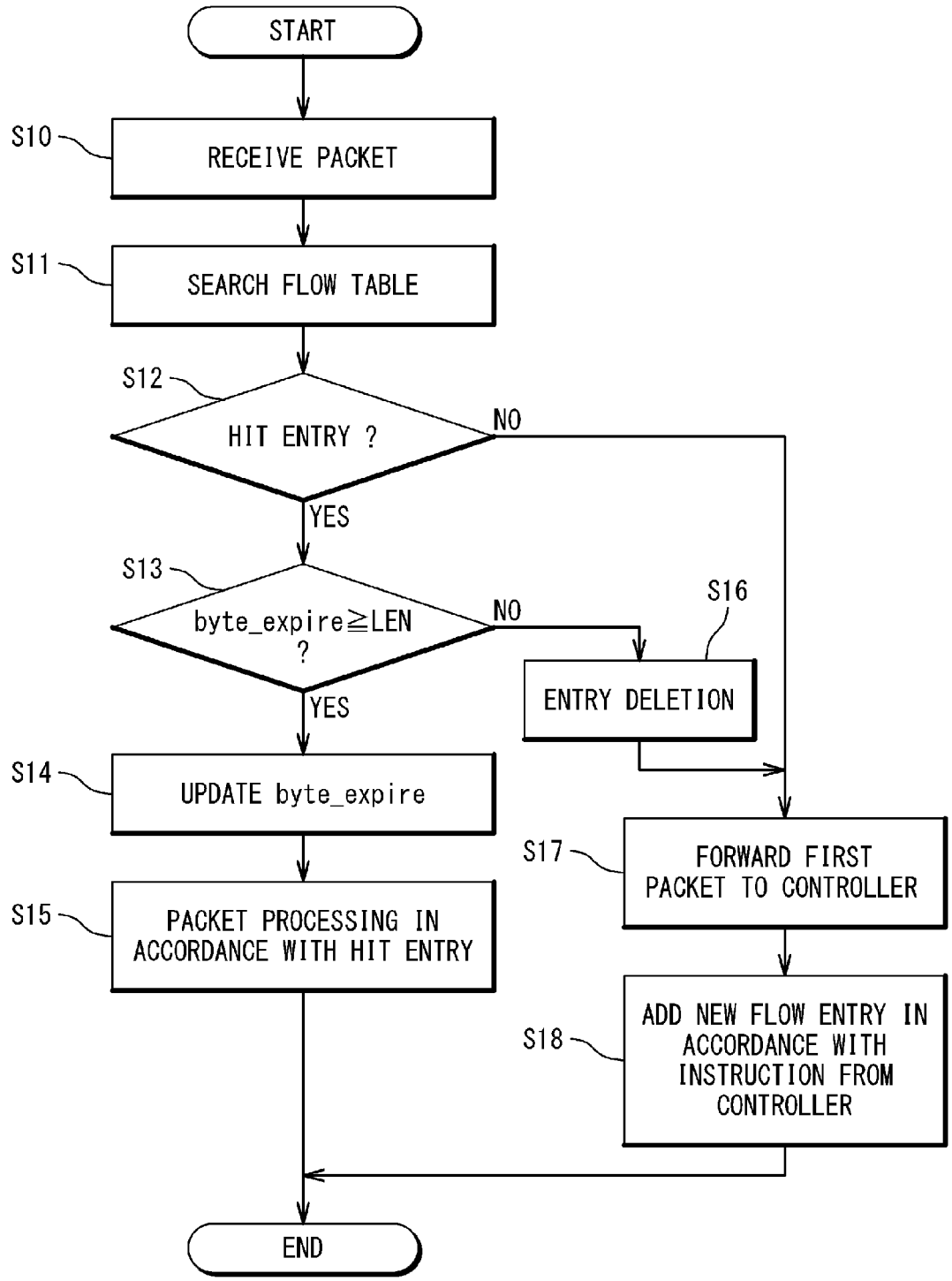
FIG. 6 is a flowchart showing processing by a node according to the exemplary embodiment of the present invention.
Figure 7:
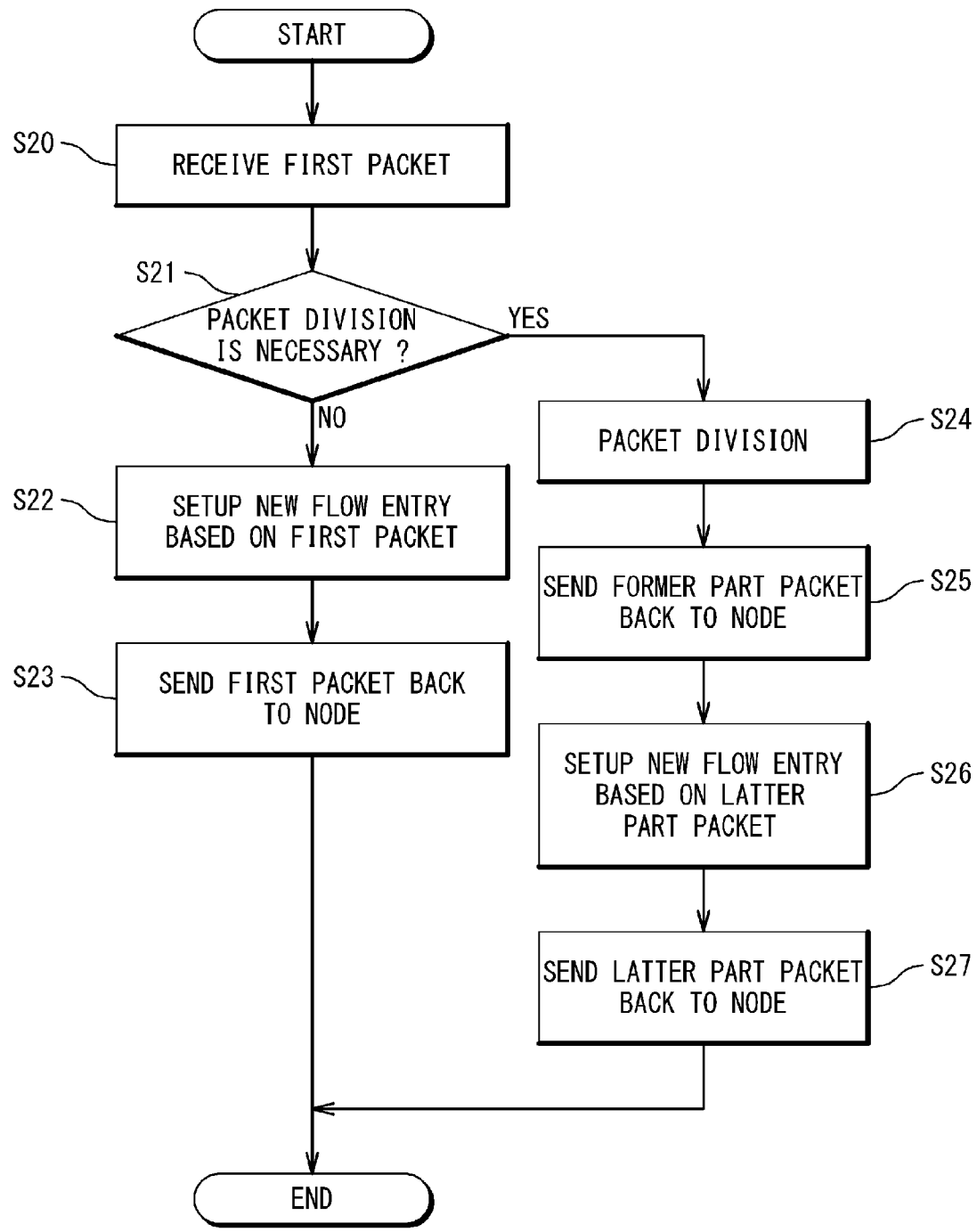
FIG. 7 is a flowchart showing processing by a controller according to the exemplary embodiment of the present invention.

A flow of processing by the flow communication system according to the present exemplary embodiment will be described below. FIG. 6 is a flowchart showing processing by the node 10. FIG. 7 is a flowchart showing processing by the controller 20.

Figure 8:
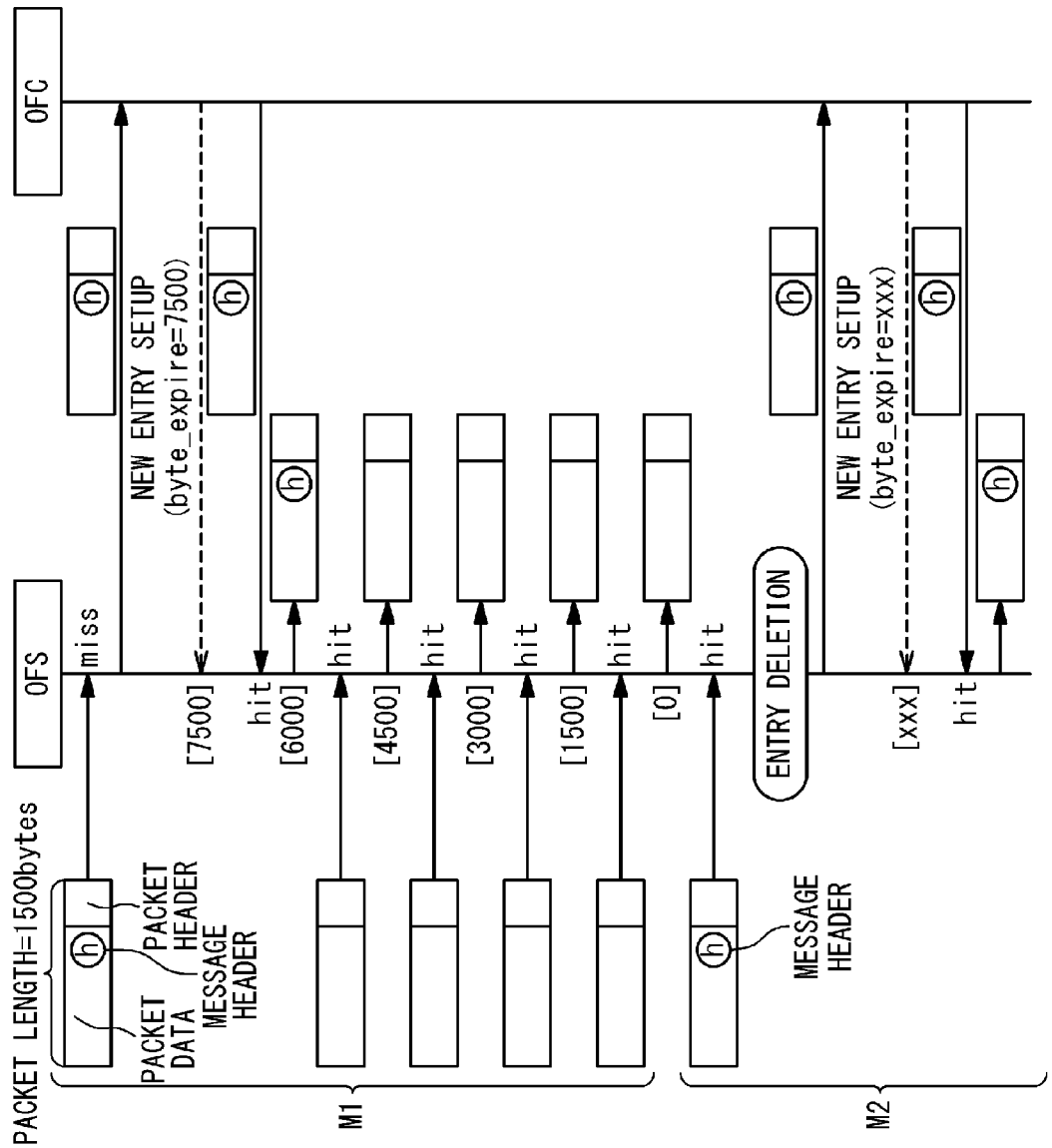
FIG. 8 shows a first processing example in the flow communication system according to the exemplary embodiment of the present invention.

A processing example shown in FIG. 8 will be described by reference to FIGS. 4 to 7 as appropriate. In the processing example shown in FIG. 8, a plurality of messages (M1 and M2) are communicated by a single flow. Here, a message length of each message (TLV (Type-Length-Value) message) is larger than a packet length, and each message is divided into a plurality of packets to be transmitted. For example, the packet length is 1500 bytes and the message length is 7300 bytes. It should be noted that the message length is indicated in a message header at the head of each message (the message header is denoted by "h" in the drawings).

First, the packet processing unit 12 of the node 10 receives an initial packet of the message M1 (Step S10). In response to the packet reception, the packet processing unit 12 refers to the flow table TBL to search for a flow entry whose match condition matches the received packet (Step S11). A flow entry that matches the received packet is hereinafter referred to as a "hit entry".

At this time, the hit entry does not exist in the flow table TBL (Step S12; No). In this case, the packet processing unit 12 uses the received packet as a first packet (entry setup request) and forwards the first packet to the controller 20 through the controller communication unit 13 (Step S17).

The controller 20 receives the first packet from the node 10 (Step S20). Next, the controller 20 determines, based on the first packet, whether division of the first packet is necessary or not (Step S21). In the processing example shown in FIG. 8, the packet division is not necessary (Step S21; No). In this case, the controller 20 sets up, based on the first packet, a new flow entry ENT for treating the first packet in the flow table TBL (Step S22).

More specifically, the controller 20 first creates a new flow entry ENT used for treating the first packet. Here, the controller 20 determines an initial value of the Byte_expire of the new flow entry ENT, namely the deletion unit length. In the present example, the deletion unit length is set to a value depending on the message length in order to change the packet processing for each message. Accordingly, the controller 20 refers to the message header at the head of a packet data of the first packet to obtain the message length (=7300 bytes) and initializes the Byte_expire to the deletion unit length depending on the message length. For example, increase by a length of the packet header is taken into consideration, and the deletion unit length (initial value of the Byte_expire) is determined to be 7500 bytes. Then, the controller 20 instructs the node 10 to add the new flow entry ENT to the flow table TBL.

The controller communication unit 13 of the node 10 receives an entry setup instruction from the controller 20 and passes the entry setup instruction to the table management unit 11. In accordance with the entry setup instruction, the table management unit 11 adds the new flow entry ENT to the flow table TBL (Step S18). After that, the controller 20 sends the first packet back to the node 10 (Step S23).

The packet processing unit 12 of the node 10 receives the first packet as a received packet again (Step S10). The packet processing unit 12 searches the flow table TBL for the hit entry that matches the received packet (Step S11). At this time, the hit entry exists in the flow table TBL (Step S12; Yes).

In the case where the hit entry exists, the table management unit 11 checks the Byte_expire of the hit entry (Step S13). More specifically, the table management unit 11 checks whether or not the Byte_expire of the hit entry is equal to or more than the packet length LEN (=1500 bytes) of the received packet. If the Byte_expire of the hit entry is equal to or more than the packet length LEN of the received packet (Step S13; Yes), the table management unit 11 decreases the Byte_expire of the hit entry by the packet length LEN (Step S14). Then, the packet processing unit 12 performs the packet processing specified by the action of the hit entry with respect to the received packet (Step S15).

Thus, packets subsequent to the first packet are treated in accordance with the same flow entry ENT, without through the controller 20. Moreover, each time the flow entry ENT becomes the hit entry, the Byte_expire of the flow entry ENT is decreased by the packet length LEN (=1500 bytes). In the example shown in FIG. 8, the Byte_expire of the flow entry ENT becomes "0" when processing for all the packets of the message M1 is completed.

Next, the packet processing unit 12 of the node 10 receives an initial packet of the message M2 (Step S10). In this case, although the hit entry exists in the flow table TEL (Step S12; Yes), the Byte_expire of the hit entry is less than the packet length LEN of the received packet (Step S13; No). This means that the deletion condition regarding the flow entry ENT is satisfied. Therefore, the table management unit 11 deletes the flow entry ENT from the flow table TBL (Step S16). Furthermore, the packet processing unit 12 uses the received packet as a first packet (entry setup request) and forwards the first packet to the controller 20 through the controller communication unit 13 (Step S17). After that, the same processing is executed with respect to the message M2.

In this manner, according to the present example, different flow entries are in turn set with respect to each of the plurality of messages. As a result, even if the plurality of messages are transmitted by the same flow, the packet processing can be changed for each message.

Figure 9:
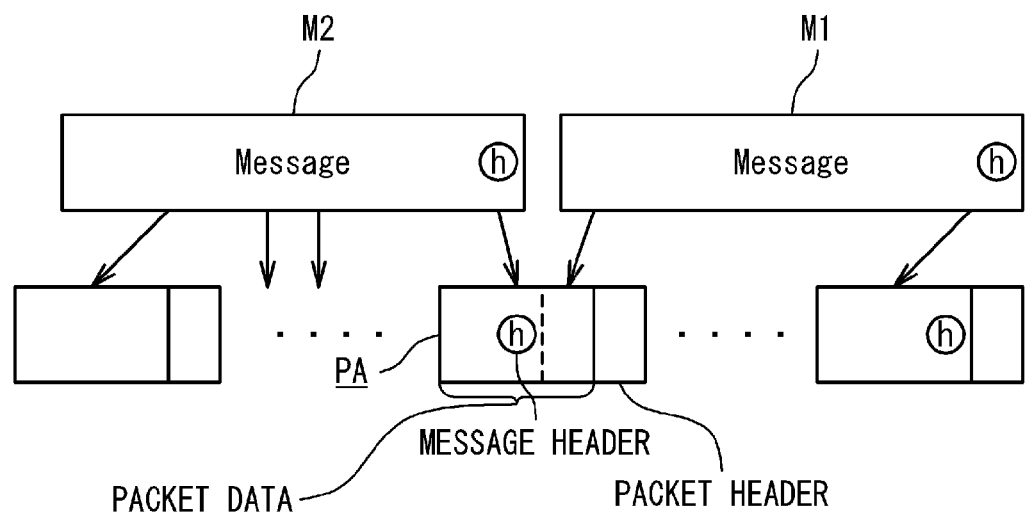
FIG. 9 is a conceptual diagram for explaining a packet that requires packet division in the exemplary embodiment of the present invention.

Next, another processing example will be described. When a plurality of messages are transmitted by the same flow, a packet including a message boundary may exist. For example, as shown in FIG. 9, there may be a case where both a data of the message M1 and a data of the message M2 are included in a packet data of a single packet PA. Specifically, the former part of the packet data of the packet PA is provided with a tail-end data of the message M1 and the latter part thereof is provided with a head data of the message M2 including the message header. In this case, division (fragmenting) of the packet PA is necessary for changing the packet processing for each message.

Figure 10:
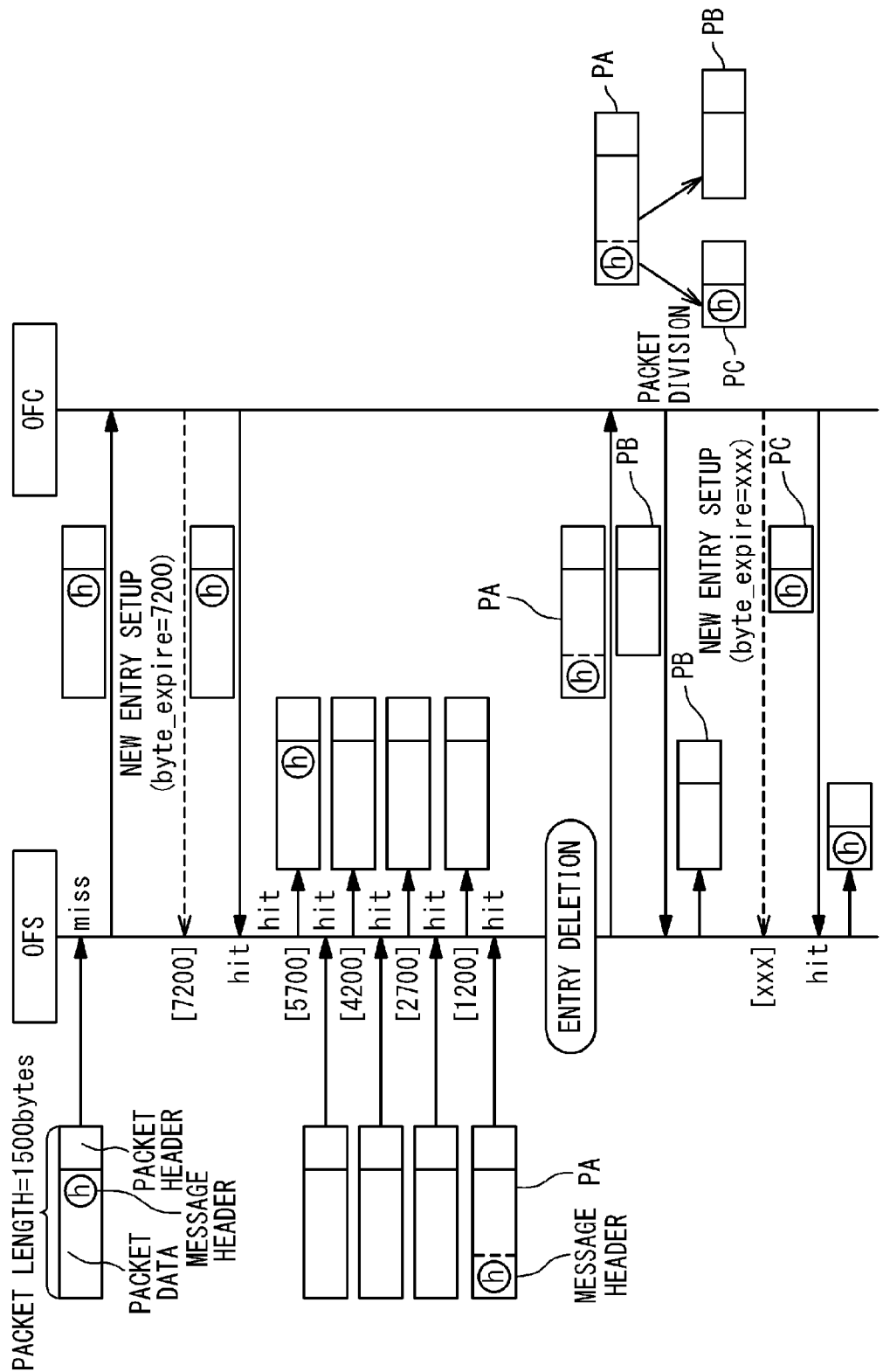
FIG. 10 shows a second processing example in the flow communication system according to the exemplary embodiment of the present invention.

FIG. 10 shows a processing example where such the division of the packet PA is performed. In the processing example shown in FIG. 10, when the node 10 receives the packet PA, the deletion condition is satisfied and thus the packet PA is forwarded as the first packet to the controller 20.

The controller 20 receives the packet PA (first packet) from the node 10 (Step S20). Next, the controller 20 determines, based on the packet PA, whether division of the packet PA is necessary or not (Step S21). In the present example, the message header does not exist at the head of the packet data of the packet PA. In this case, the controller 20 determines that the packet division is necessary (Step S21; Yes) and divides the packet PA into a former part packet PB and a latter part packet PC (Step S24). The former part packet PB has, as a packet data, a former part of the packet data of the packet PA before the message header. On the other hand, the latter part packet PC has, as a packet data, a latter part of the packet data of the packet PA after the message header.

The controller 20 sends the former part packet PB back to the node 10 (Step S25). At this time, the flow entry ENT matching the former part packet PB is already deleted. Therefore, the controller 20 concurrently instructs the packet processing to be applied to the former part packet PB. In accordance with the instruction, the packet processing unit 12 of the node 10 treats the former part packet PB.

Meanwhile, the controller 20 sets, based on the latter part packet PC, a new flow entry ENT for treating the latter part packet PC in the flow table TBL (Step S26). Here, the controller 20 refers to the message header at the head of the packet data of the latter part packet PC to obtain the message length and initializes the Byte_expire to the deletion unit length depending on the message length. After the new flow entry ENT is added to the flow table TBL, the controller 20 sends the latter part packet PC back to the node 10 (Step S27). The latter part packet PC is treated in accordance with the new flow entry ENT. In this manner, the packet processing can be changed for each message.

It should be noted that the message length itself may be used as the deletion unit length without considering a length of the packet header. In this case, the deletion condition is satisfied earlier, which causes no problem.

The present exemplary embodiment may be used in combination with the conventional entry deletion processing depending on the time-out.

4. Examples of Application 4-1. First Example of Application

Figure 11:
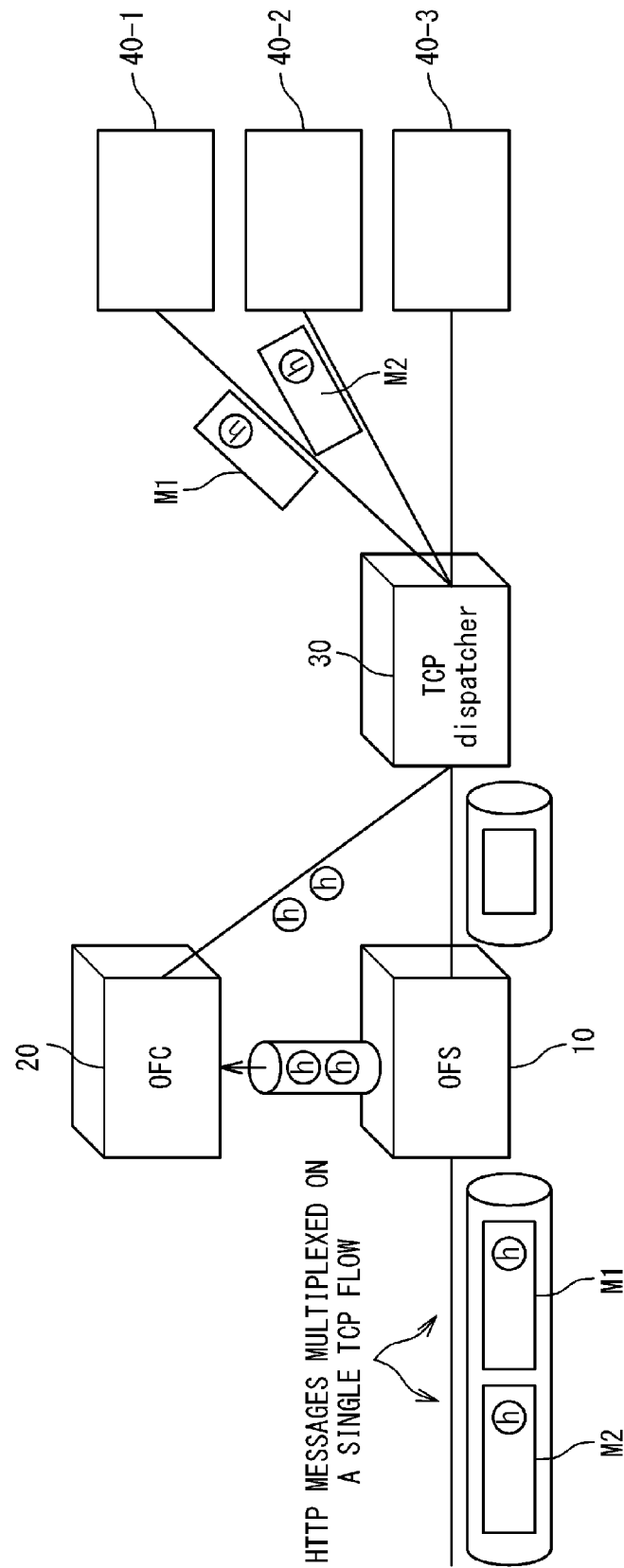
FIG. 11 shows a first example of application of the exemplary embodiment of the present invention.
Figure 12:
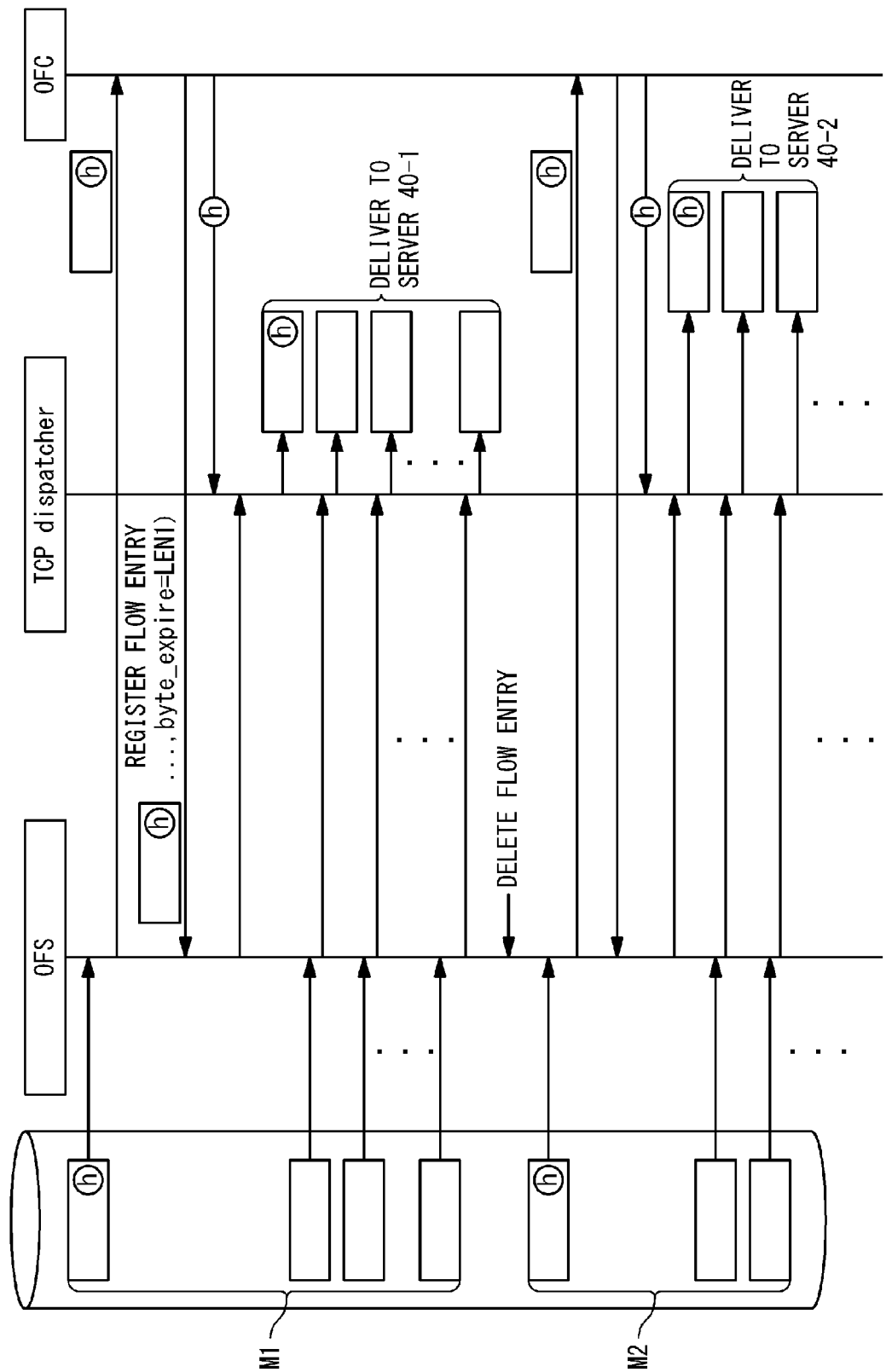
FIG. 12 shows processing in the first example of application of the exemplary embodiment of the present invention.

FIGS. 11 and 12 show a first example of application of the present exemplary embodiment. The first example of application relates to load balancing when a plurality of HTTP messages (M1 and M2) are multiplexed on a single TCP flow. The node 10 is an open flow switch (OFS), and the controller 20 is an open flow controller (OFC). In a case of keep alive option, a plurality of HTTP messages are included in a single TCP connection. The open flow controller 20 determines, based on a message header of each HTTP message, a destination server 40 for packets of the each HTTP message. The open flow controller 20 specifies the destination server 40 for each HTTP message for the TCP dispatcher 30. The TCP dispatcher 30 dispatches packets to the respectively specified destination servers 40. For example, the HTTP message M1 is dispatched to the server 40-1, and the HTTP message M2 is dispatched to the server 40-2. In this manner, the load balancing is possible even in the case where the plurality of HTTP messages are multiplexed on the single TCP flow.

4-2. Second Example of Application

Figure 13:
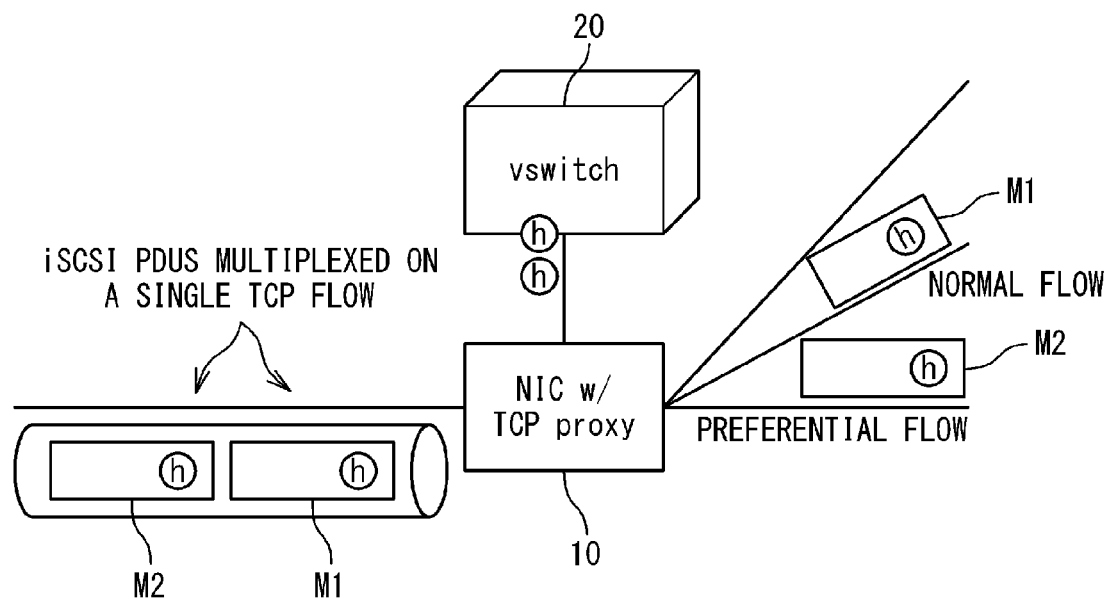
FIG. 13 shows a second example of application of the exemplary embodiment of the present invention.
Figure 14:
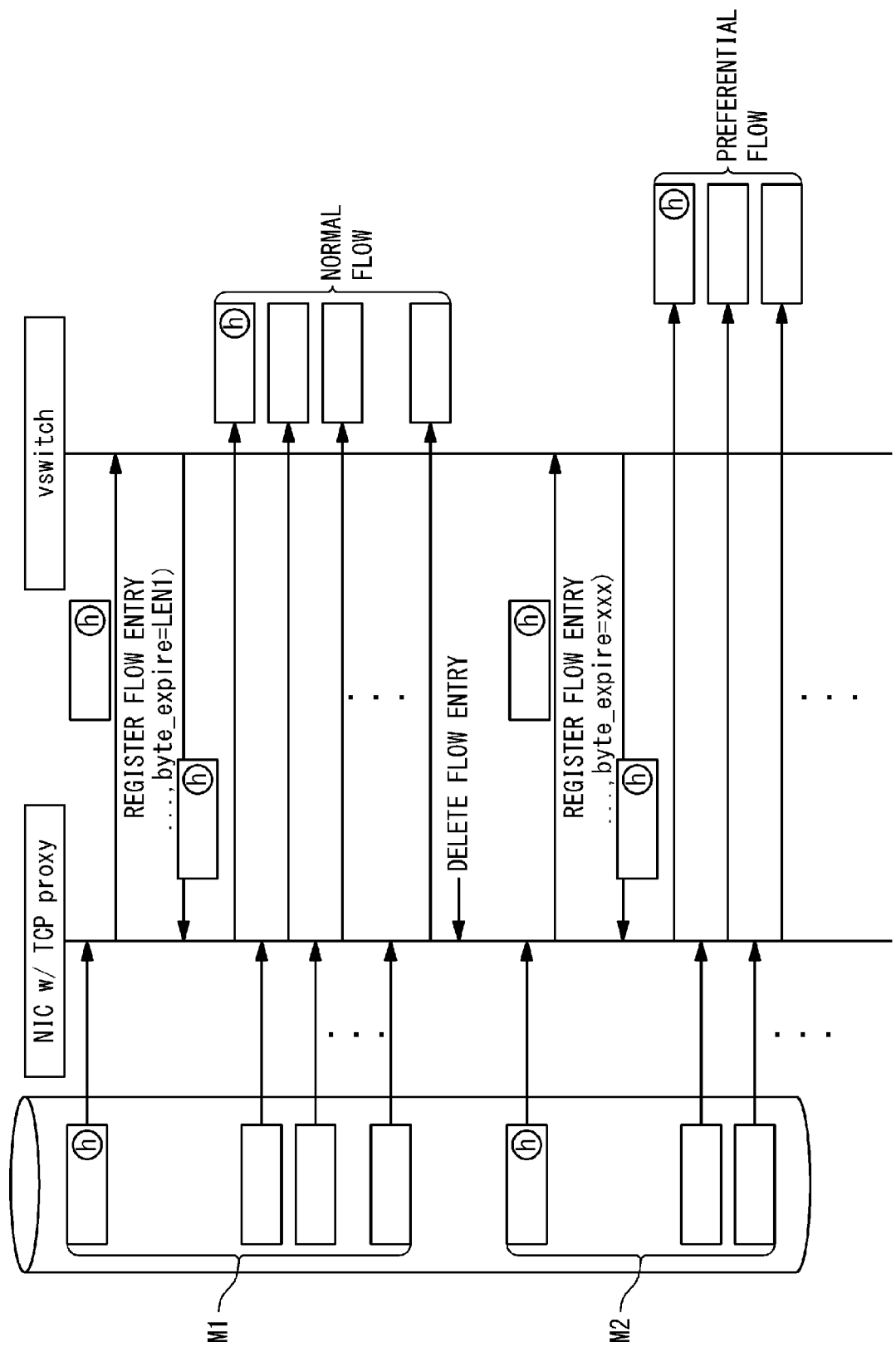
FIG. 14 shows processing in the second example of application of the exemplary embodiment of the present invention.

FIGS. 13 and 14 show a second example of application of the present exemplary embodiment. The second example of application relates to a case where a plurality of iSCSI LUN flows are multiplexed on a single TCP flow. In order to preferentially dispatch only a specific iSCSI LUN flow, the present exemplary embodiment is applicable. The node 10 is a NIC, and the controller 20 is a vswitch. The vswitch 20 refers to the header to determine a flow (normal flow or preferential flow) for each PDU. The vswitch 20 sets only a specific iSCSI LUN flow to the preferential flow.

While the exemplary embodiments of the present invention have been described above with reference to the attached drawings, the present invention is not limited to these exemplary embodiments and can be modified as appropriate by those skilled in the art without departing from the spirit and scope of the present invention.

While a part of or whole of the above-described exemplary embodiments may be described as the following Supplementary notes, it is not limited to that.

(Supplementary Note 1)

A flow communication system comprising:

a node having a flow table; and a controller configured to set a flow entry in said flow table, wherein each flow entry that is set in said flow table specifies packet processing which is performed with respect to a packet matching a match condition, wherein a flow entry that a packet received by said node matches is a hit entry, wherein if said hit entry exists in said flow table, said node performs said packet processing specified by said hit entry with respect to said received packet, wherein if a deletion condition with regard to a first flow entry in said flow table is satisfied, said node deletes said first flow entry from said flow table, and wherein said deletion condition includes that a sum of packet lengths of all the received packets matching said first flow entry after said first flow entry is set up exceeds a predetermined deletion unit length.

(Supplementary Note 2)

The flow communication system according to Supplementary note 1, wherein each flow entry that is set in said flow table further has a remaining processing amount as a parameter, wherein when setting up a new flow entry, said controller initializes said remaining processing amount to said predetermined deletion unit length, wherein if said first flow entry becomes said hit entry, said node checks said remaining processing amount of said first flow entry, wherein if said remaining processing amount is equal to or more than a packet length of said received packet, said node decreases said remaining processing amount of said first flow entry by the packet length of said received packet, and wherein if said remaining processing amount is less than the packet length of said received packet, said deletion condition is satisfied and said node deletes said first flow entry from said flow table.

(Supplementary Note 3)

The flow communication system according to Supplementary note 1 or 2, wherein if said hit entry does not exist in said flow table or if said deletion condition is satisfied, said node forwards said received packet as a first packet to said controller, and wherein in response to reception of said first packet, said controller sets up a new flow entry for treating said first packet in said flow table.

(Supplementary Note 4)

The flow communication system according to Supplementary note 3, wherein a plurality of messages are communicated by a single flow, and wherein said controller determines said predetermined deletion unit length based on a message length of each of said plurality of messages and sets in turn different flow entries with respect to each of said plurality of messages.

(Supplementary Note 5)

The flow communication system according to Supplementary note 4, wherein said message length is specified in a message header, and wherein if said message header exists at a head of a packet data of said first packet, said controller sets up said new flow entry based on said message header and thereafter sends said first packet back to said node.

(Supplementary Note 6)

The flow communication system according to Supplementary note 5, wherein if said message header does not exist at the head of the packet data of said first packet, said controller divides said first packet into a second packet and a third packet, wherein said second packet has, as a packet data, a part of said packet data of said first packet before said message header, wherein said third packet has, as a packet data, a part of said packet data of said first packet after said message header, wherein said controller sends said second packet back to said node with instructing said packet processing to be applied to said second packet, and wherein said controller sets up said new flow entry based on said message header and thereafter sends said third packet back to said node.

(Supplementary Note 7)

The flow communication system according to any one of Supplementary notes 1 to 6, wherein said node is an open flow switch, and
said controller is an open flow controller.

(Supplementary Note 8)

A node comprising:

a table management unit configured to manage a flow table; and a packet processing unit configured to perform packet processing with respect to a received packet, wherein each flow entry that is set in said flow table specifies said packet processing which is performed with respect to a packet matching a match condition, wherein a flow entry that said received packet matches is a hit entry, wherein if said hit entry exists in said flow table, said packet processing unit performs said packet processing specified by said hit entry with respect to said received packet, wherein if a deletion condition with regard to a first flow entry in said flow table is satisfied, said table management unit deletes said first flow entry from said flow table, and wherein said deletion condition includes that a sum of packet lengths of all the received packets matching said first flow entry after said first flow entry is set up exceeds a predetermined deletion unit length.

(Supplementary Note 9)

The node according to Supplementary note 8, wherein each flow entry that is set in said flow table further has a remaining processing amount as a parameter, wherein when a new flow entry is set up in said flow table, said remaining processing amount is initialized to said predetermined deletion unit length, wherein if said first flow entry becomes said hit entry, said table management unit checks said remaining processing amount of said first flow entry, wherein if said remaining processing amount is equal to or more than a packet length of said received packet, said table management unit decreases said remaining processing amount of said first flow entry by the packet length of said received packet, and wherein if said remaining processing amount is less than the packet length of said received packet, said deletion condition is satisfied and said table management unit deletes said first flow entry from said flow table.

This application is based upon and claims the benefit of priority from Japanese patent application No. 2011-031737, filed on Feb. 17, 2011, the disclosure of which is incorporated herein in its entirely by reference.

EXPLANATION OF REFERENCE NUMERALS 1 flow communication system
10 node
11 table management unit
12 packet processing unit
13 controller communication unit
15 port
20 controller
TBL flow table

The invention claimed is:

1. A flow communication system comprising:
a node having a flow table; and
a controller configured to set a flow entry in said flow table,
wherein each flow entry that is set in said flow table specifies packet processing which is performed with respect to a packet matching a match condition,
wherein a flow entry that a packet received by said node matches is a hit entry,
wherein if said hit entry exists in said flow table, said node performs said packet processing specified by said hit entry with respect to said received packet,
wherein if a deletion condition with regard to a first flow entry in said flow table is satisfied, said node deletes said first flow entry from said flow table, and
wherein said deletion condition includes that a sum of packet lengths of all the received packets matching said first flow entry after said first flow entry is set up exceeds a predetermined deletion unit length.

2. The flow communication system according to claim 1,
wherein each flow entry that is set in said flow table further has a remaining processing amount as a parameter,
wherein when setting up a new flow entry, said controller initializes said remaining processing amount to said predetermined deletion unit length,
wherein if said first flow entry becomes said hit entry, said node checks said remaining processing amount of said first flow entry,
wherein if said remaining processing amount is equal to or more than a packet length of said received packet, said node decreases said remaining processing amount of said first flow entry by the packet length of said received packet, and
wherein if said remaining processing amount is less than the packet length of said received packet, said deletion condition is satisfied and said node deletes said first flow entry from said flow table.

3. The flow communication system according to claim 1,
wherein if said hit entry does not exist in said flow table or if said deletion condition is satisfied, said node forwards said received packet as a first packet to said controller, and
wherein in response to reception of said first packet, said controller sets up a new flow entry for treating said first packet in said flow table.

4. The flow communication system according to claim 3,
wherein a plurality of messages are communicated by a single flow, and
wherein said controller determines said predetermined deletion unit length based on a message length of each of said plurality of messages and sets in turn different flow entries with respect to each of said plurality of messages.

5. The flow communication system according to claim 4, wherein said message length is specified in a message header, and
wherein if said message header exists at a head of a packet data of said first packet, said controller sets up said new flow entry based on said message header and thereafter sends said first packet back to said node.

6. The flow communication system according to claim 5, wherein if said message header does not exist at the head of the packet data of said first packet, said controller divides said first packet into a second packet and a third packet,
wherein said second packet has, as a packet data, a part of said packet data of said first packet before said message header,
wherein said third packet has, as a packet data, a part of said packet data of said first packet after said message header,
wherein said controller sends said second packet back to said node with instructing said packet processing to be applied to said second packet, and
wherein said controller sets up said new flow entry based on said message header and thereafter sends said third packet back to said node.

7. The flow communication system according to claim 1, wherein said node is an open flow switch, and
said controller is an open flow controller.

8. A node comprising:
a table management unit configured to manage a flow table; and
a packet processing unit configured to perform packet processing with respect to a received packet,
wherein each flow entry that is set in said flow table specifies said packet processing which is performed with respect to a packet matching a match condition,
wherein a flow entry that said received packet matches is a hit entry,
wherein if said hit entry exists in said flow table, said packet processing unit performs said packet processing specified by said hit entry with respect to said received packet,
wherein if a deletion condition with regard to a first flow entry in said flow table is satisfied, said table management unit deletes said first flow entry from said flow table, and
wherein said deletion condition includes that a sum of packet lengths of all the received packets matching said first flow entry after said first flow entry is set up exceeds a predetermined deletion unit length.

9. The node according to claim 8,
wherein each flow entry that is set in said flow table further has a remaining processing amount as a parameter,
wherein when a new flow entry is set up in said flow table, said remaining processing amount is initialized to said predetermined deletion unit length,
wherein if said first flow entry becomes said hit entry, said table management unit checks said remaining processing amount of said first flow entry,
wherein if said remaining processing amount is equal to or more than a packet length of said received packet, said table management unit decreases said remaining processing amount of said first flow entry by the packet length of said received packet, and
wherein if said remaining processing amount is less than the packet length of said received packet, said deletion condition is satisfied and said table management unit deletes said first flow entry from said flow table.

* * * * *